United States Patent [19]
Grenier et al.

[11] Patent Number: 5,081,345
[45] Date of Patent: Jan. 14, 1992

[54] SYSTEM FOR LOCATING A MOVING OBJECT USING MATRIX DETECTOR AND TIME INTEGRATION

[75] Inventors: Gilles Grenier, Le Mesnil Saint Denis; Denis Guyot, Versailles, both of France

[73] Assignee: Societe Anonyme dite: Aerospatiale Societe Nationale Industrielle, Paris, France

[21] Appl. No.: 602,125

[22] Filed: Oct. 22, 1990

[30] Foreign Application Priority Data

Oct. 23, 1989 [FR] France .................. 89 13841

[51] Int. Cl.$^5$ .................................... G01B 11/26
[52] U.S. Cl. ........................ 250/206.1; 356/141
[58] Field of Search .............. 250/206.1, 561, 203.1, 250/203.4; 244/3.13, 3.16, 3.17; 356/4, 5, 141, 152, 373, 375

[56] References Cited

U.S. PATENT DOCUMENTS

| | | | |
|---|---|---|---|
| 3,761,180 | 9/1973 | Maxwell, Jr. et al. | 356/152 |
| 4,027,837 | 6/1977 | Miller, Jr. et al. | 244/3.16 |
| 4,154,530 | 5/1979 | Connolly, Jr. et al. | 356/152 |
| 4,197,424 | 4/1980 | Osada | 375/106 |
| 4,419,012 | 12/1983 | Stephenson et al. | 356/141 |
| 4,710,028 | 12/1987 | Grenier et al. | 356/376 |
| 4,740,681 | 4/1988 | Tsuno | 356/152 |
| 4,946,277 | 8/1990 | Marquet et al. | 250/206.1 |

FOREIGN PATENT DOCUMENTS 0206912 12/1986 European Pat. Off.
0307381 3/1989 European Pat. Off.

*Primary Examiner*—Edward P. Westin
*Assistant Examiner*—S. Allen
*Attorney, Agent, or Firm*—Marshall, O'Toole, Gerstein, Murray & Bicknell

[57] ABSTRACT

A system is disclosed for locating a moving object, comprising a transmitter transmitting light flashes, connected to the moving object and a charge transfer and frame transfer photosensitive detector disposed in a fixed station and connected by electronic means, the transmitter and the detector being driven by individual, initially synchronized time bases. From time to time, but preferably periodically, the duration of an integration time of said detector is reduced to a value at most equal to the duration of the light flashes, so that said corresponding light flash occurs at least partially during the preceding transfer time or following said reduced integration time and said electronic means calculate the relative time drift between said time bases from the light trace formed by said flash on said matrix detector and use this calculated drift for re-setting the time base of the detector with respect to that of the transmitter.

4 Claims, 5 Drawing Sheets

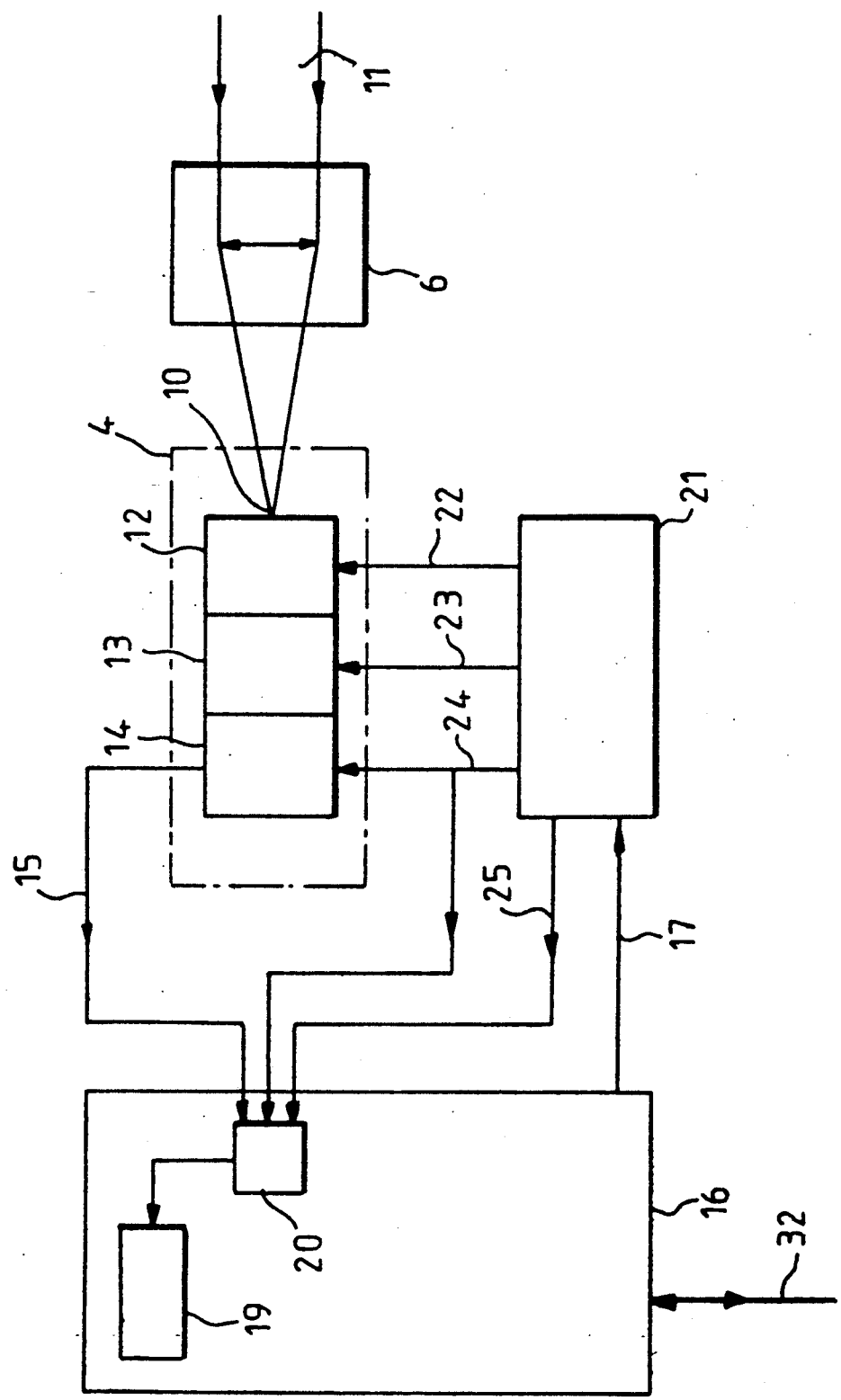

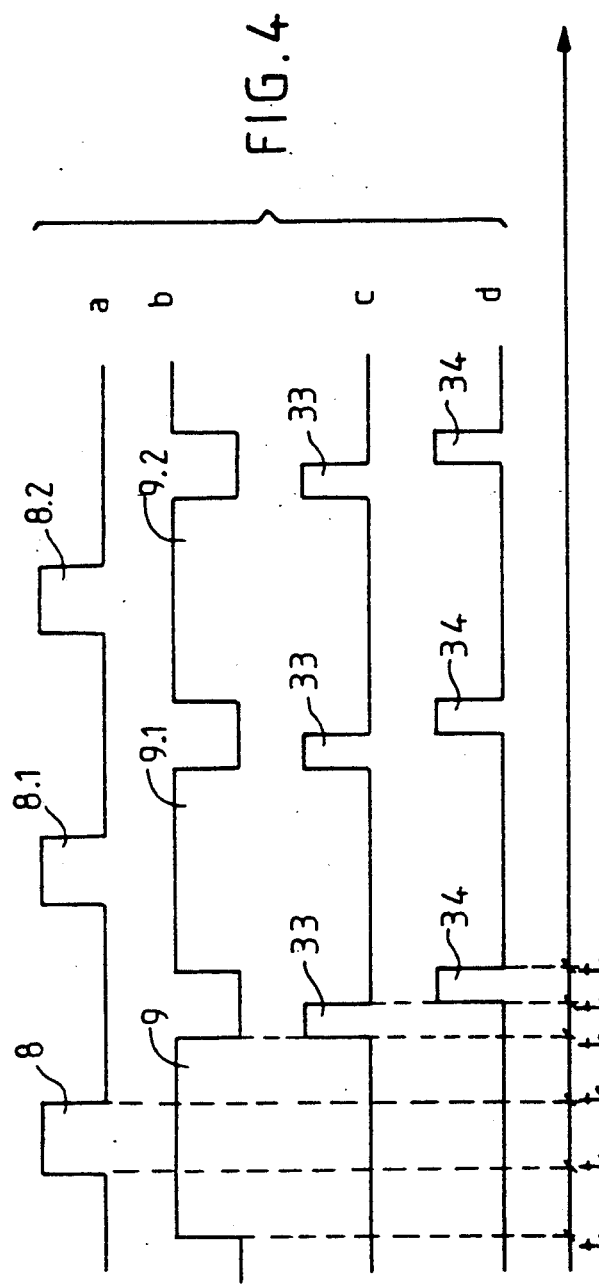
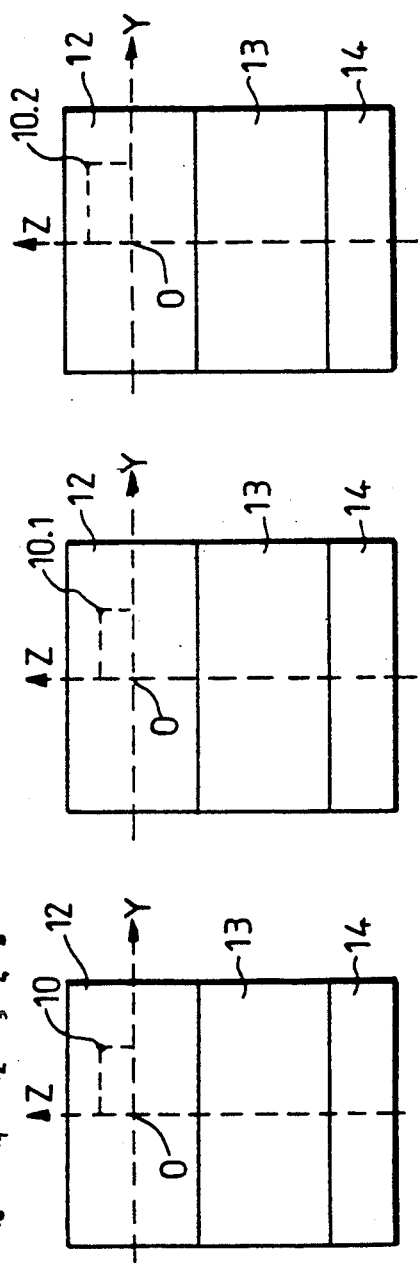

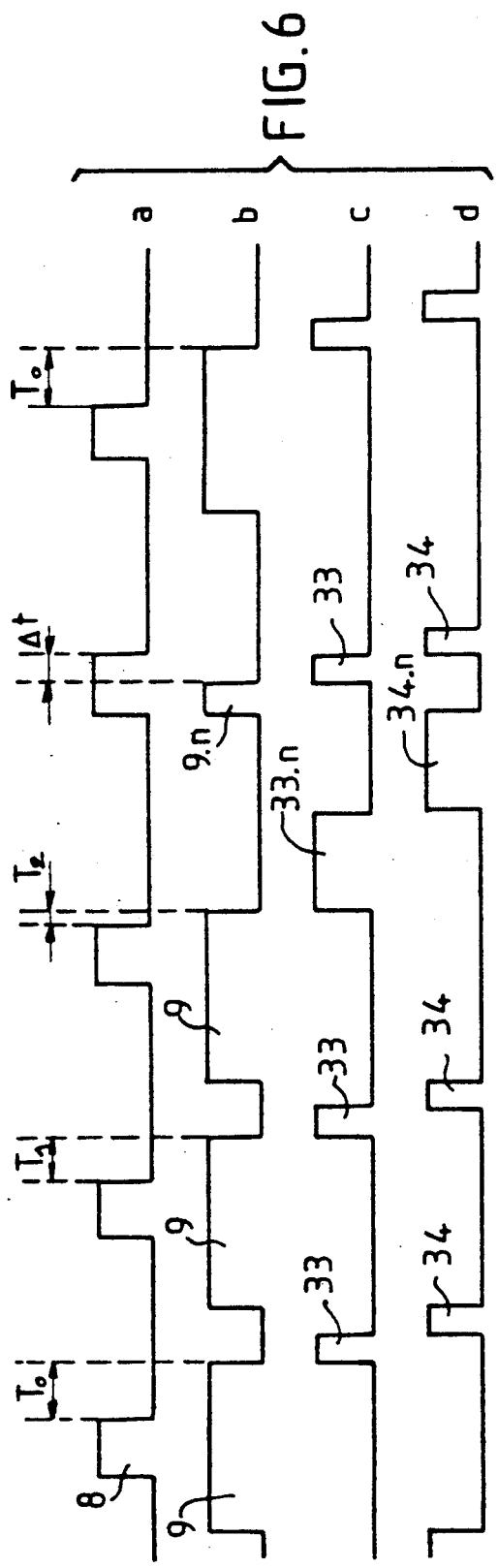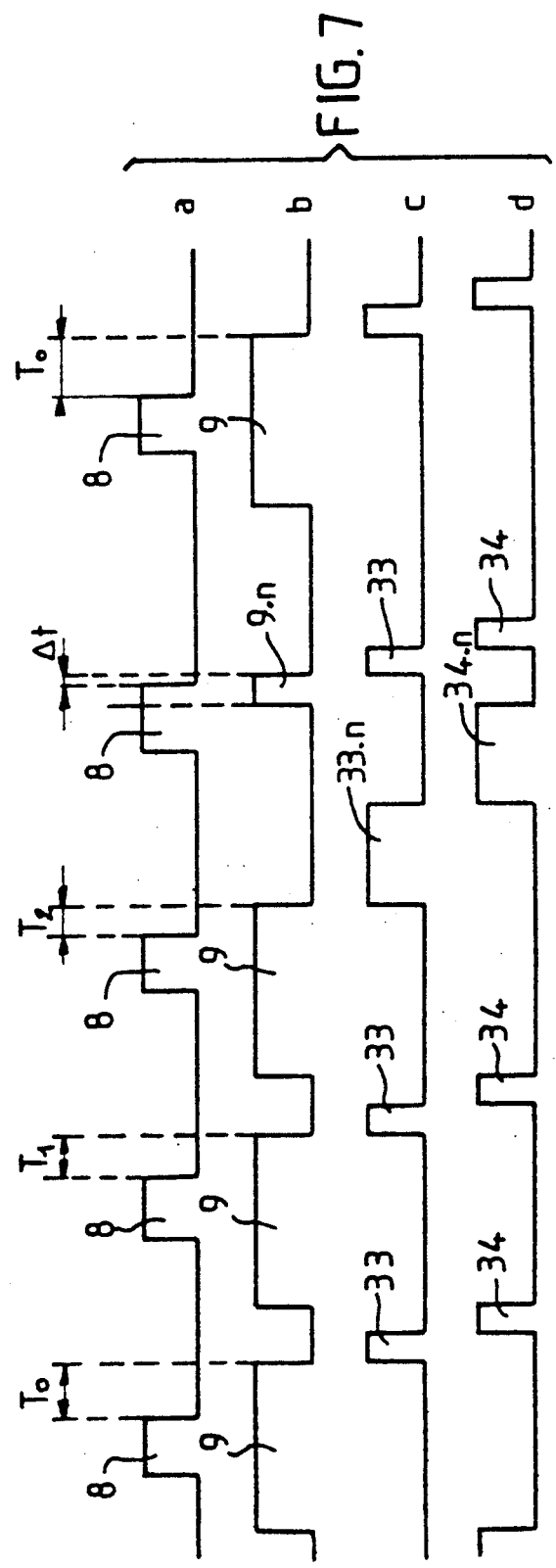

SYSTEM FOR LOCATING A MOVING OBJECT USING MATRIX DETECTOR AND TIME INTEGRATION

BACKGROUND OF THE INVENTION

1. Field of the Invention

The present invention relates to a system for locating a moving object. Although not exclusively, it is particularly appropriate to the location and guidance of missiles, for example anti-tank missiles.

2. Description of the Prior Art

From the U.S. Pat. No. 4,717,028, a system is already known for locating a moving object with respect to an axis, comprising an optical detector disposed in a fixed station and cooperating with an optical transmitter connected to said moving object, which is remarkable in that:

said optical detector comprises, on the one hand, a fixed matrix of photosensitive charge transfer elements (CCD matrix or similar), whose plane is at least substantially orthogonal to said axis and which is associated with an optical system adapted to form on said matrix an image of the environment of said axis in which said moving object is likely to move and, on the other hand, electronic means for controlling said photosensitive elements;

said optical transmitter generates light flashes and synchronization means are provided so that said electronic control means deliver control pulses synchronized with said light flashes and initiate image taking.

Thus, with such a system, the position of the moving object with respect to the axis is given by the position of the photosensitive elements of the matrix, energized by the image of the light flashes, with respect to said axis.

It will be noted that the optical transmitter generating light flashes and connected to the moving object may be a light beacon carried thereby or else a simple mirror receiving light flashes from a fixed beacon and reflecting said flashes towards the optical detector.

In this known system, since operation is pulsed and not continuous, a particularly high signal/noise ratio may be obtained. In fact, it is possible to take pictures which have a duration equal to that of the flashes of the optical transmitter and which are synchronized in frequency and phase with the light transmission.

Thus, synchronization of the detector and the transmitter make it possible to operate said detector with a useful signal ratio close to the peak value of the power of the transmitter.

The transmitter-detector connection may then operate with a high signal/noise ratio, for a low mean power, which limits the consumption and the cost of the transmitter.

As is explained in this prior patent, synchronization between the detector and the transmitter may be obtained by permanent connection means or else by temporary connection means, said detector and transmitter then comprising means (time bases) for individually maintaining said synchronization.

In the first case (permanent connection means), synchronization may be provided by an immaterial connection or by a material connection. If it is an immaterial connection, of radioelectric type, it is expensive for it is necessary to integrate appropriate equipment in the moving object; in addition, such radioelectric connection is sensitive to jamming and to electromagnetic disturbances, which is a serious drawback, and may lead to loss of the moving object by the optical detector. If it is a material connection, it must have a high pass-band so as to allow a high synchronization frequency. Such a material connection can then only be formed by an optical fiber, which confers a high cost on the system. In any case, a material connection necessarily limits the radius of action of the moving object with respect to the optical transmitter.

Thus, it is often advantageous and even necessary for synchronization to be obtained using time bases synchronized by a temporary connection, previous to launching of the moving object, one of said time bases being associated with the detector and the other with the transmitter.

However, the errors in initial calculation of the period and the relative drifts of the two time bases introduce a temporary slipping of the integration time of the CCD matrix with respect to the flashes of the transmitter. It is then necessary to extend the integration times of the CCD matrix so that each flash is always contained in the corresponding integration time interval, during the flight time of the missile. But then, the signal/noise ratio is not as good and the result obtained may be scarcely better than in the case of a continuous transmitter.

SUMMARY OF THE INVENTION

The purpose of the present invention is to overcome these drawbacks. It makes it possible to track the moving object in time, in a closed loop, without any other connection than the optical connection used for location to be established between the moving object and the locating system. With the invention, it is the CCD matrix itself which makes it possible to permanently re-loop the transmission-integration synchronization.

For this, according to the invention, the system for locating a moving object with respect to an axis comprising:

an optical transmitter connected to said moving object and generating light flashes, under the dependence of a first time base; and a photosensitive detector disposed in a fixed station and associated with an optical system observing the environment of said axis in which said moving object is likely to move, said photosensitive detector comprising a charge transfer and frame transfer matrix detector controlled by electronic means associated with a second time base, and said matrix detector comprising a photosensitive zone on which said optical system is able to form the substantially pinpoint image of said light flashes, the succession of the integration times of the images in said photosensitive zone and of the transfer times of said images therefrom being under the dependence of the second time base;

said first and second time bases being temporarily synchronized before launching of said moving object so that each of said light flashes occurs during an image integration time of said photosensitive zone, is remarkable in that, from time to time, the duration of an integration time of said photosensitive zone is reduced to a value at most equal to the duration of said light flashes, so that the corresponding light flash occurs at least partially during the transfer time preceding or following said reduced integration time, and in that said electronic means, on the one hand, calculate the relative time drift of said first and second time bases from the light trace formed by said light flash on said photosensitive zone and, on the other hand, use this calculated drift for re-setting said second time base with respect to the first one.

As can be seen, the present invention uses the property of the image integration zones of the line transfer CCD matrix detectors of being sensitive to an image during the transfer times.

Preferably, the reduction of duration of an integration time of said photosensitive zone, the calculation of said relative time drift of said first and second time bases and re-setting of said second time base with respect to the first one are periodic.

These different operations then take place systematically every n integration times, the number n being for example equal to 10.

Advantageously, said electronic means calculate said relative time drift $\Delta t$ between said first and second time bases from the expression:

$$\Delta t = m/F$$

in which m is the number of lines of said photosensitive zone over which said light trace extends and F is the transfer frequency of the lines in said matrix detector.

Since, with the invention, setting of the integration time of the matrix detector with respect to the light flashes is obtained permanently, it is possible:

to reduce the requirements concerning previous synchronization;

to reduce the safety time margin taken on the integration, which improves the connection result; and to accept relative drifts of the time bases of the transmitter and of the detector.

The highest accuracy in time is acquired for pinpoint light sources, whose transmission duration is of the same order of size as that of the line transfers. If necessary it is possible to voluntarily reduce the duration of the light transmission for the particular measurement every n frames. The connection result is identical considering the non spread of the trace because of the transfers in this case.

In an advantageous embodiment of the system of the present invention, the times of said light flashes are between 5 and 10 microseconds, the integration times of the photosensitive zone are, except when they are reduced below the times of said light flashes, between 10 and 20 microseconds, and the transfer times corresponding to the non reduced integration times are about 10 microseconds.

BRIEF DESCRIPTION OF THE DRAWINGS

The figures of the accompanying drawings will better show how the invention may be carried out. In these figures, identical references designate identical elements.

FIG. 2 is the block diagram of the charge transfer and frame transfer matrix detector used in the system of FIG. 1;

FIGS. 4a to 4d are timing diagrams illustrating the synchronized operation of the system of FIG. 1;

FIGS. 5a to 5c show schematically the formation of the pinpoint image of a flash on the matrix detector;

FIGS. 6a to 6d and FIGS. 7a to 7d are timing diagrams illustrating the actual operation of the system of the invention, respectively in two different configurations.

DESCRIPTION OF THE PREFERRED EMBODIMENT

Figure 1:
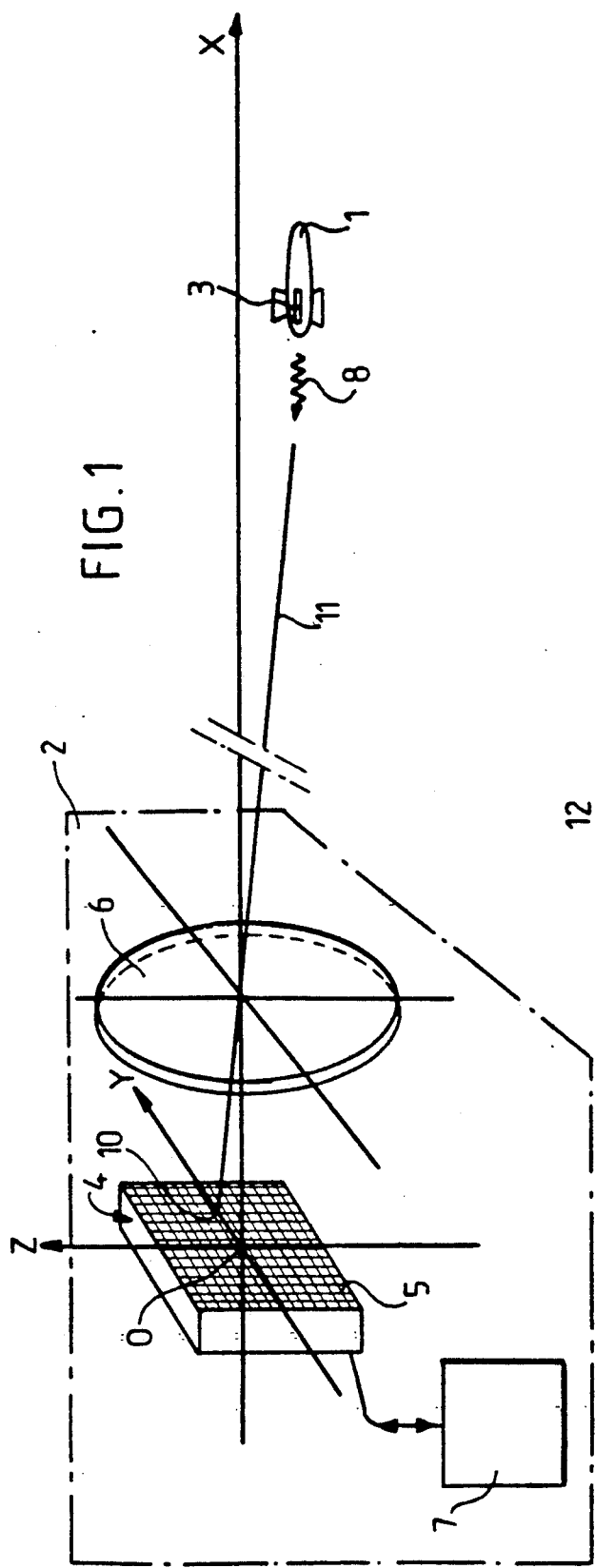
FIG. 1 is a schematic view illustrating the locating system according to the invention.

The embodiment of the locating system in accordance with the invention and shown in FIG. 1 is intended to continuously know the position of a missile 1, with respect to an axis OX which, for example, represents the sighting line of an anti-tank weaponry system (not shown), equipped with said locating device.

The locating system is essentially formed of an optical detector 2 disposed in a fixed station, for example in said weaponry system, and a pulsed light beacon 3 carried by said missile. It will be noted that beacon 3 could be disposed in a fixed station, for example in detector 2, the missile 1 then carrying a mirror which would reflect towards the detector 2 the flashes which would be sent to it by said fixed beacon. The transmitter connected to said missile would then be formed by said mirror.

The fixed detector 2 comprises essentially a matrix detector 4 formed of photosensitive elements 5 of the charge transfer and frame transfer CCD type, an optical system 6 and an electronic circuit 7 for implementing the matrix detector 4.

In the matrix detector 4, the photosensitive elements 5 are disposed in a coplanar arrangement of lines and columns, respectively parallel to an axis OY and an axis OZ. Point 0 is for example the center of the matrix detector 4 and axes OX, OY and OZ form a system of rectangular axes whose axis OX is orthogonal to the plane of the matrix detector 4, whereas axes OY and OZ are coplanar with said matrix detector.

The optical system 6 is capable of forming on the matrix detector 4 the image of the space surrounding axis OX and particularly the pinpoint image of the light flashes 8 transmitted by beacon 3.

As will be seen in detail hereafter, the electronic circuits 7 make it possible to read the charges generated by the photosensitive elements of the matrix detector during integration times 9 (see FIG. 4), i.e. to take successive images of the space surrounding axis OX. The duration of exposure of the matrix detector 4, i.e. the duration of the integration times 9 and of said image taking is short and corresponds to the integration times of the photons on the sensitive zones of the photosensitive elements 5. According to the invention, it may be about 10 to 20 microseconds.

The light beacon 3 comprises a pulsed source capable of transmitting light flashes 8 of visible or infrared light. For example, this source is a Xenon lamp having a concentration optical system, or else a generator or a laser diode with or without optical system.

The flashes 8 have a short duration, for example of about 10 microseconds.

Preferably, said pulsed source is equipped with a filter of low spectral width, limiting the radiation of beacon 3. Similarly, an identical filter is then associated with the optical system 6 of detector 2, so as to eliminate the radiation outside the transmitting band of beacon 3 and to permit spectral separation which may be desirable.

With a temporary initial synchronization connection, broken before launching of missile 1, the transmission of flashes 8 by beacon 3 is synchronized with the images taken by the matrix detector 4, initiated by circuit 7. This is illustrated in FIGS. 4a to 4d which show that the integration times 9 are synchronized with flashes 8. The duration of each integration time 9 is at least equal to that of flashes 8 so that each flash is entirely covered in time by an integration time 9.

Since the synchronization connection is temporary, detector 2 and beacon 3 comprise stable clocks (time bases) capable of maintaining the synchronization of the image taking integration times 9 and of flashes 8, during the whole flight of said missile.

Thus, whenever a flash 8 is transmitted by beacon 3, detector 2 is active so that the pinpoint image 10 of this flash, made by the optical system 6, strikes an element 5 of the matrix detector 4. This energized element 5 forms then the image of the flash 8 seen by detector 2. Since the flash 8 is connected to missile 1, the coordinates of the energized element 5 with respect to axes OY and OZ are characteristics of the position of said missile 1 with respect to axis OX.

From the coordinates of said energized element 5, circuits 7 may elaborate a signal representative of said position, used possibly to correct the trajectory of said missile.

The theoretical operation which has just been described assumes that the synchronization between beacon 3 and the optical detector 2 remains perfect during the whole travel of missile 1. Now, because of the synchronization errors due to the temporary initial synchronization connection, on the one hand, and to the drift of the time bases provided on the beacon and the detector, on the other hand, maintenance of the synchronization is illusory, so that it is necessary to re-set the detector from time to time with respect to the beacon, or vice versa. This is precisely the object of the present invention.

However, before explaining in detail the method according to the invention, it seems useful to describe more precisely the CCD matrix detector 5 and its operating mode, in connection with FIG. 2.

In this FIG. 2, it can be seen that the charge transfer and frame transfer matrix 4 comprises:
- a photosensitive zone 12 which receives the pulsed light beam 11 (flashes 8) coming from beacon 3 and which is formed of a plurality of lines of photosensitive elements 5 and over the whole of which said optical system 6 is capable of forming an image; this photosensitive zone 12 is adapted to integrate the electric charges generated by the photons of said image so as to generate image information in an electric form;
- an intermediate memory zone 13, which is formed of a plurality of lines of memory elements and in which said electric image information contained in the lines of said photosensitive zone 12 is transferred line by line; and
- a reading register 14, in which the electric image information corresponding to each line of the intermediate memory zone 13 is transferred in parallel, said reading register 14 generating, at its output 15, a video signal representative of the image received from the optical system by the photosensitive zone 12.

The matrix detector 4 is further associated:
- with a processing unit 16, external to said matrix detector 4 and generating, at its output 17, the parameters defining acquisition of the images, such as the exposure duration of the images, synchronization of the images taken, synchronization of reading, etc ... with at least one memory 19, the access to which is controlled by a control device 20; memory 19 and device 20 are external to the matrix detector 4 and are advantageously incorporated in the processing unit 16; and
- a sequencer 21 receiving from the output 17 of the processing unit 16 said parameters for acquiring the images and charged with controlling the image taking by the photosensitive zone 12 and controlling the information transfers.

For this, sequencer 21 comprises in particular:
- an output 22 on which a signal appears addressed to the photosensitive zone 12 and intended to cause the electric image information to progress line by line inside said photosensitive zone 12 in the direction of the intermediate memory zone 13;
- an output 23 on which a signal appears addressed to the intermediate memory zone 13 and intended to cause the electric image information to progress line by line inside said intermediate memory zone 13 in the direction of said reading register 14;
- an output 24 on which appears a signal addressed to the reading register 14 and intended to control the latter so that it addresses to memory 19, via its output 15 and the control device 20, a series video signal from the parallel information which it receives from the intermediate memory zone 13. Furthermore, output 24 is also connected to said control device 20 of said memory 19; and
- an output 25 on which appears a validation signal addressed to said control device 20.

Each of the signals appearing at outputs 22, 23 and 25 of sequencer 21 is formed of a succession of constant frequency pulses, each pulse corresponding to a passage from one line to the next (for zones 12 and 13) or to the transformation of a parallel line into a series line (for the reading register 14).

Figure 3:
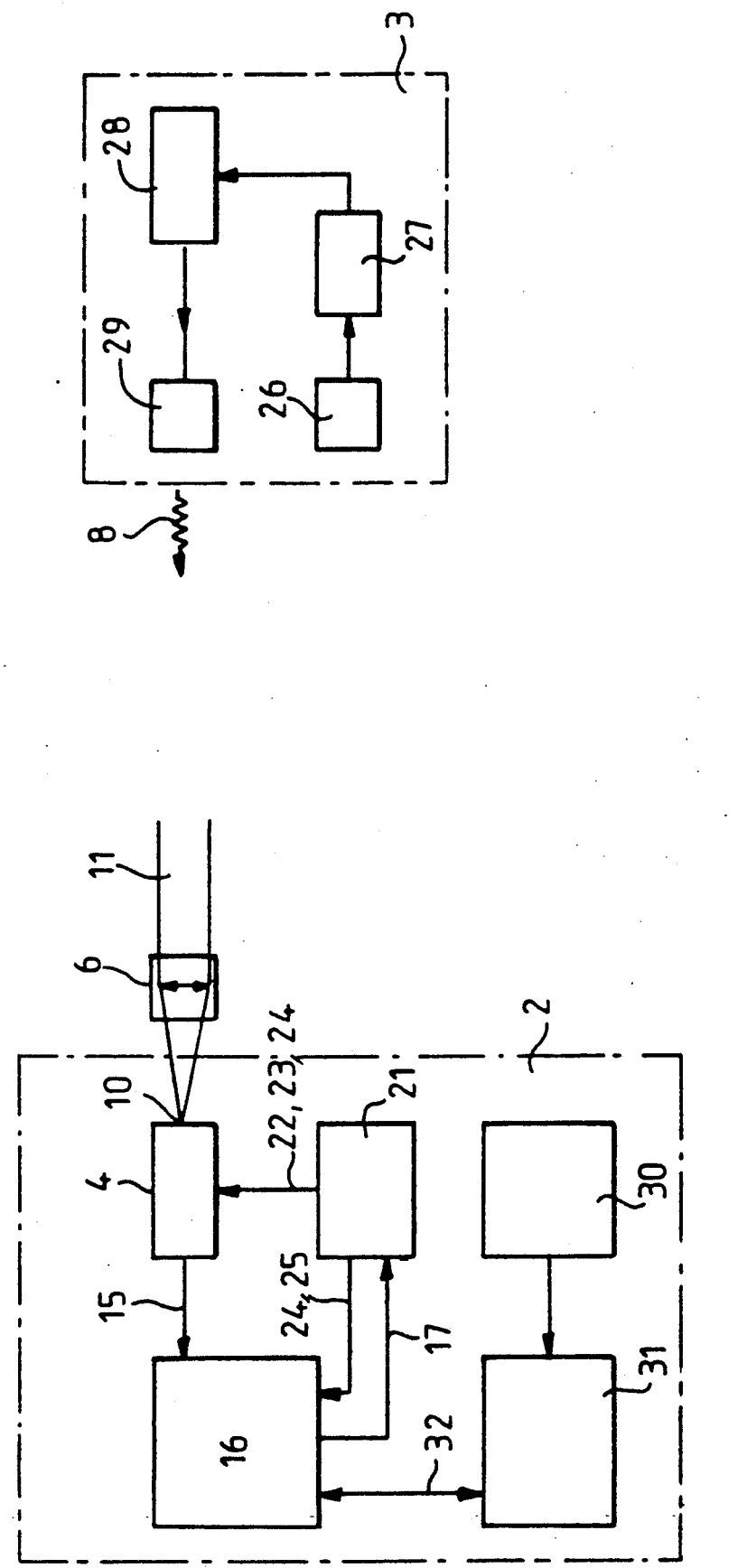
FIG. 3 gives the block diagram of the system of FIG. 1.

In FIG. 3, one embodiment of the system of the invention has been shown while taking into account the diagram of FIG. 2. It can be seen that the optical transmitter 3 comprises a time base 26 feeding a sequencer 27, controlling an electronic tripping device 28 which itself controls the light source 29 transmitting the flashes 8.

The electronic circuits controlling the optical detector 2 comprise a time base 30 connected to a processor 31, activating the image acquisition processing unit 16 via control 32. According to the diagram of FIG. 2, sequencer 27 is connected to the matrix detector 4 by connections 22, 23 and 24 and to the processing unit 16 by connections 17, 24 and 25. In addition, the connection 15 between the matrix detector 4 and the processing unit 16 has been shown. It can be seen that devices 16, 21, 30 and 31 form the electronic circuit 7 of FIG. 1.

The theoretical operation of the system shown in FIGS. 1 and 3 is explained hereafter, in connection with FIG. 2, the diagrams of FIGS. 4a to 4d and the diagrams of FIGS. 5a to 5c.

At an initial time t0, it is assumed that the photosensitive zone 12 is completely emptied of the information which it contained previously. Sequencer 21 emits no signal at its output 22 so that an integration time 9 begins (see FIG. 4b). Thus, when at time t1, subsequent to, a light flash 8 appears (see FIG. 4a) the image of this flash is integrated in the photosensitive zone 12, until time t2 at which said light flash is terminated. At time t3, subsequent to t2, the integration time 9 is terminated.

Thus, in the photosensitive zone 12, the pinpoint image 10 of the light flash 8, representative of the position of the missile 1 with respect to the axis OX, is formed on a particular photosensitive element 5 of this photosensitive zone 12. It will be noted that the position of the pinpoint image 10 in the photosensitive zone 12 (see FIG. 5a) only depends on the position of missile 1 with respect to axis OX; it is in particular independent of the time relation between the light flash 8 and the integration time 9. The position of the light flash 8 inside the integration time 9 has no influence on the position of image 10 on the photosensitive zone 12.

At time t3 corresponding to the end of the integration time 9, sequencer 21 emits a signal at its outputs 22 and 23, without emitting at its output 24. Consequently, the image 10 of flash 8 is advanced line by line in the direction of the intermediate memory zone 13. The transfer of the lines from the photosensitive zone 12 into the intermediate memory zone 13 takes place during the timing pulse 33 and is terminated at time t4, subsequent to t3. At this time t4, sequencer 21 emits a signal at its outputs 23 and 24, without emitting at its output 22, so that the contents of the intermediate memory 13 is read by the reading register 14. Such reading extends until time t5, subsequent to t4 (see the timing pulse 34 of FIG. 4d). During the pulse 34, the contents of the intermediate memory 13 is advanced line by line towards reading register 14, then transferred thereinto, which addresses it, through its output 15, to memory 19. Because of the connection between the output 24 of sequencer 21 and the control device 20, the video signal at said output 15 of the reading register 14 is staggered and synchronized by the reading signal appearing at output 24.

It will be noted that the line by line transfers of the contents of the photosensitive zone 12 into the intermediate memory zone 13 then of the contents of this intermediate memory zone into the reading register 14, then serialization of said contents by register 14, make it possible without difficulty to know the position of image 10 with respect to the axes OY and OZ, i.e. the position of missile 1 with respect to axis OX.

At time t5, we have the situation of time to and a new cycle can being again with a new integration time 9.1 and a new light flash 8.1.

In the photosensitive zone 12 there then appears the image 10.1 of the following flash 8.1 (see FIG. 5b). It will be noted that, because of the high frequency of pulses 9 and flashes 8, the position of the image 10.1 is scarcely different from that of image 10.

Through a succession of pulses 8, 8.1, 8.2 . . . , 9, 9.1, 9.2, . . . 33, 34, . . . , it is possible to follow practically continuously the position 10, 10.1, 10.2 (FIG. 5c) of the missile 1 with respect to axis OX.

It will be noted that the above described theoretical operation assumes that the synchronism of the succession of integration times 9, 9.1, 9.2, . . . and flashes 8, 8.1, 8.2, . . . is, if not perfect, at least sufficiently good for said flashes to occur during said integration times.

Now, the relative drift of the time bases 26 and 30, as well as the errors committed at the time of temporary synchronization thereof, make such operation illusory. In actual fact, the initial setting to between pulses 8 and 9 (see FIGS. 6a and 7a) varies (T1, T2, . . . ) to the extent that flashes 8 would occur outside the integration times 9.

Thus, in accordance with the invention, it is provided from time to time, for example periodically, every n integration times 9 (for example n = 10), for the duration tot3 of an integration time 9 to be reduced to a value (for example equal to 1 microsecond) at most equal to the duration tlt2 of flashes 8. In FIGS. 6 and 7, an integration time 9.n has been shown corresponding to such a reduced integration time. In the two examples shown, it has been assumed that the duration of each reduced integration time 9.n was less than that of flashes 8.

Of course, such reduction, preferably periodic, of the duration of the integration times 9, causes correspondingly an extension of the transfer pulses 33 and 34 (see the transfer pulses 33.n and 34.n of FIG. 6 and 7).

The reduction of the duration of the integration times 9.n and the corresponding extension of the duration of pulses 33.n and 34.n are managed by the processor 31, which addresses its orders to unit 16, itself consequently controlling the sequencer 21 over the connection 17.

Because of the reduction of duration of the integration time 9.n, the corresponding light flash 8 extends partially, either over the duration of the transfer pulses 33 and 34 immediately following the integration time 9.n (case of FIG. 6), or over the elongate transfer pulses 33.n and/or 34.n preceding said integration time 9.n (case of FIG. 7).

Figure 9:
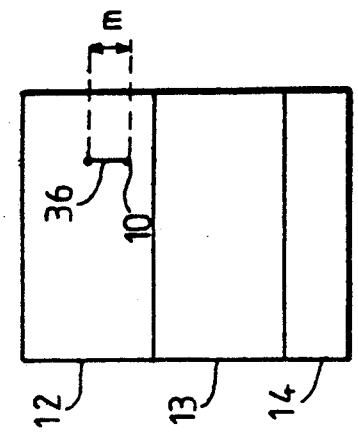
FIGS. 8 and 9 illustrate the state of the photosensitive zone of the matrix detector, respectively in the configurations of FIGS. 6a to 6d and 7a to 7d.
Figure 8:
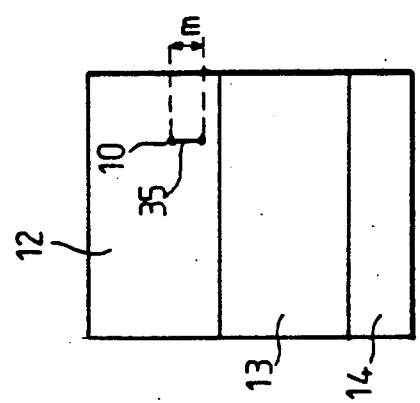

Thus, said light flash 8 partially strikes the photosensitive zone 12 during the transfer of the contents therefrom into the intermediate memory zone 13 and/or into reading register 14. The result is, in the first case, a light trace 35 which extends over several image lines from the image 10 formed by the part of light flash 8 in time correspondence with the reduced integration time 9.n (see FIG. 8) and, in the second case, a light trace 36 which extends over several image lines as far as said image 10 (see FIG. 9).

If m is the number of image lines over which traces 35 and 36 extend, it can be seen that :

$$m = F \times \Delta t$$

in which F (for example equal to 2 Mhz) is the transfer frequency of the image lines and $\Delta t$ the shift between the reduced integration time 9.n and the corresponding flash 8.

Of course, the processor 31 knows the frequency F; in addition, it knows the number of lines m through the control unit 16. It may then readily calculate $\Delta t$.

Processor 31 then readily calculates the shift $T \pm \Delta t$ (the sign + corresponding to the case of FIG. 6 and the sign − to that of FIG. 7), which the relative drift of the time bases 26 and 30 has introduced into the integration times 9 and the light flashes 8.

It may then control the control unit 16 and sequencer 21 for re-setting said integration times 9 with respect to the light flashes 8, so that the integration time 9 following the reduced integration time 9.n has, with respect to the corresponding light flash 8, a time setting equal to the initial setting to.

Thus, continuous re-setting of the integration times 9 with respect to flashes 8 is obtained.

Of course the previous beacon 3—detector 2 synchronization is provided on departure of missile 1 with sufficient accuracy (for example 0.5 microseconds) to maintain, for a few successive images (taken for example at the rate of about 50 Hz), the light transmission of the flashes 8 (for example 5 to 10 microseconds) in short integration times 9 (for example 20 microseconds), synchronized in phase and frequency with the transmission of said flashes.

What is claimed is:

1. In a system for locating a moving object with respect to an axis comprising:
    an optical transmitter connected to said moving object and generating light flashes, under the dependence of a first time base; and
    a photosensitive detector disposed in a fixed station and associated with an optical system observing the environment of said axis in which said moving object is likely to move, said photosensitive detector comprising a charge transfer and frame transfer matrix detector controlled by electronic means associated with a second time base, and said matrix detector comprising a photosensitive zone on which said optical system is able to form the image of said light flashes, the succession of the integration times of the images in said photosensitive zone and of the transfer times of said images therefrom being under the dependence of the second time base;
said first and second time bases being temporarily synchronized before launching of said moving object so that each of said light flashes occurs during an image integration time of said photosensitive zone, wherein, from time to time, the duration of an integration time of said photosensitive zone is reduced to a value at most equal to the duration of said light flashes, so that the corresponding light flash occurs at least partially during the transfer time preceding or following said reduced integration time, and said electronic means, on the one hand, calculate the relative time drift of said first and second time bases from the light trace formed by said light flash on said photosensitive zone and, on the other hand, use this calculated drift for re-setting said second time base with respect to the first one.

2. The system as claimed in claim 1, wherein the reduction of duration of an integration time of said photosensitive zone, the calculation of said relative time drift of said first and second time bases and re-setting of said second time base with respect to the first one are periodic.

3. The system as claimed in claim 1, wherein said electronic means calculate said relative time drift $\Delta t$ between said first and second time bases from the expression:

$$\Delta t = m/F$$

in which m is the number of lines of said photosensitive zone over which said light trace extends and F is the transfer frequency of the lines into said matrix detector.

4. The system as claimed in claim 1, wherein the times of said light flashes are between 5 and 10 microseconds, the integration times of the photosensitive zone are, except when they are reduced below the times of said light flashes, between 10 and 20 microseconds, and the transfer times corresponding to the non reduced integration times are about 10 microseconds.

* * * * *